United States Patent [19]
Kmiec et al.

[11] Patent Number: 5,775,720
[45] Date of Patent: Jul. 7, 1998

[54] SHOCK ABSORBING APPARATUS

[75] Inventors: Daniel F. Kmiec, Birmingham; William Benjamin Turck, Taylor, both of Mich.

[73] Assignee: Ford Global Technologies, Inc., Dearborn, Mich.

[21] Appl. No.: 725,043

[22] Filed: Oct. 3, 1996

[51] Int. Cl.$^6$ ............................................. B60G 3/20
[52] U.S. Cl. .......................... 280/667; 280/668; 280/696
[58] Field of Search .............................. 280/667, 668, 280/666, 670, 673, 685, 696, 701, 724

[56] References Cited

U.S. PATENT DOCUMENTS

| | | | |
|---|---|---|---|
| 3,155,382 | 11/1964 | Shakespear | 280/667 |
| 3,907,080 | 9/1975 | Chadwick | 188/322 |
| 4,042,259 | 8/1977 | Fiedler et al. | 280/701 |
| 4,210,343 | 7/1980 | Shiomi et al. | 280/668 |
| 4,298,193 | 11/1981 | Mourray | 267/63 R |
| 4,804,169 | 2/1989 | Hassen | 280/668 |
| 4,805,886 | 2/1989 | Hassan | 267/220 |
| 4,828,232 | 5/1989 | Harrod et al. | 267/64.24 |
| 4,871,187 | 10/1989 | Schaible | 280/667 |
| 4,934,730 | 6/1990 | Okuzumi | 280/668 |
| 5,211,380 | 5/1993 | Germano | 280/668 |
| 5,487,535 | 1/1996 | Carter et al. | 267/220 |

FOREIGN PATENT DOCUMENTS

| | | |
|---|---|---|
| 41 10471 A1 | 3/1991 | Germany. |
| 4001858 | 10/1991 | Germany. |
| 3-61734 | 3/1991 | Japan. |
| 2 037 399 | 7/1980 | United Kingdom. |

*Primary Examiner*—Kenneth R. Rice
*Attorney, Agent, or Firm*—Gregory P. Brown

[57] ABSTRACT

A shock absorbing apparatus suitable for use in a motor vehicle having a first component (16) and a second component 18 movable relative to one another is described. The shock absorbing apparatus (48) includes a first, second and third metallic members (54, 74, 90) for providing positive control of the total compression of a shock absorber (14) under jounce loading. Additionally, a second hollow member (82) attaches to an elastomeric member (62), which when compressed under jounce loading retracts to provide clearance for a spring perch 28 located on a first hollow member (20).

17 Claims, 2 Drawing Sheets

SHOCK ABSORBING APPARATUS

FIELD OF THE INVENTION

This invention relates generally to shock absorbers and strut assemblies for use in motor vehicle suspensions. More particularly, the present invention relates to a shock absorbing apparatus that may be arranged within a shock absorber or strut assembly for providing metal to metal contact upon reaching a predetermined state of compression.

DISCLOSURE INFORMATION

Shock absorbers and strut assemblies operate to dampen motion of a suspension relative to a motor vehicle's body and chassis structure. When the suspension moves upward, the shock absorber is compressed, this compression is also referred to as jounce. Jounce bumpers are elastic members located on the shock absorber to cushion the impact of the shock absorber reaching its mechanical travel limit in full jounce. The jounce bumper must be effective at fully stopping the compression the shock absorber to prevent interference of a valve assembly disposed within the shock absorber with a lower end of a shock body. Traditionally, exceedingly large jounce bumpers have been used to prevent interference, in addition to providing additional clearance between the valve assembly and the lower end of the shock absorber for severe impacts which may over compress the jounce bumper. For suspensions of equal travel, these design constraints have resulted in shock absorbers taking on greater length than is otherwise desirable for purposes of packaging in vehicles having low hood lines.

Shock absorbers and strut assemblies also commonly incorporate dust shields which extend over a rod of the shock absorber which slides in and out of a shock absorber body. The dust shield protects the finish of the rod which passes through seals inside the shock absorber body. Degradation of the surface finish on the rod can negatively effect the life of the shock absorber. Therefore, it is important that the dust shield prevents surface blemishes from occurring on the rod itself. The length of the dust shield should be sufficient to cover the rod through full extension of the shock absorber. This is becoming increasingly difficult, as current suspension designs place a coil spring coaxially about the shock absorber with the lower end of the spring being mounted on a spring perch attached to the shock absorber body. Thus, the dust shield should not be so long as to interfere with the spring perch under compression, while still covering the rod when the shock absorber is fully extended.

It would be desirable to provide a package efficient shock absorber apparatus capable of positively controlling the compression of the shock absorber to reduce the clearance necessary to eliminate valve body interference with the lower end of the shock absorber during full compression.

It would be further desirable to provide a shock absorber having a dust shield that can provide full coverage of the shock absorber rod while not interfering with the spring perch.

SUMMARY OF THE INVENTION

According to the present invention, a shock absorbing apparatus is disclosed for use in a motor vehicle having a first component, or suspension member, movably attached to a second component, or body structure or chassis. The shock absorbing apparatus includes a first hollow member having a first end attached to the first component and a second end located opposite from the first end. A rod is also provided having a first end attached to the second component and a second end passing through the second end and slidably disposed within the first hollow member. The shock absorber also includes a first metallic member having a first aperture therein for receiving the first end of the rod therethrough. The first metallic member is attached to the second component. A shock absorbing apparatus further includes an elastomeric member having a second aperture therein for receiving the first end of the rod therethrough. The elastomeric member is also secured to the first end of the rod.

The shock absorbing apparatus also includes a second metallic member having an outer periphery and a third aperture therein defining an inner periphery for receiving the elastomeric member and the rod therethrough. A second hollow member includes a first end which is attached to the outer periphery of the second metallic member. The second hollow member extends from the first end away from the second metallic member toward the second end of the rod.

Additionally, the shock absorbing apparatus includes a third metallic member securely disposed on the second end of the first hollow member. Together the first, second and third metallic members are aligned with one another to provide metal to metal contact when the elastomeric member undergoes a predetermined compression.

An advantage of this shock absorbing apparatus is to provide metal to metal contact under a predetermined compression of the elastomeric member, thereby positively controlling the relationship of the valve assembly disposed on the second end of the rod relative to the first end of the first hollow member, thereby preventing interference therebetween under severe jounce conditions.

A further advantage of the present invention is the ability of the dust shield or the second hollow member to move upward with the elastomeric member under jounce to provide greater clearance between the dust shield and a lower spring perch which may be mounted on the exterior body of the shock absorber, the first hollow member.

DETAILED DESCRIPTION OF THE PREFERRED EMBODIMENT

Figure 1:
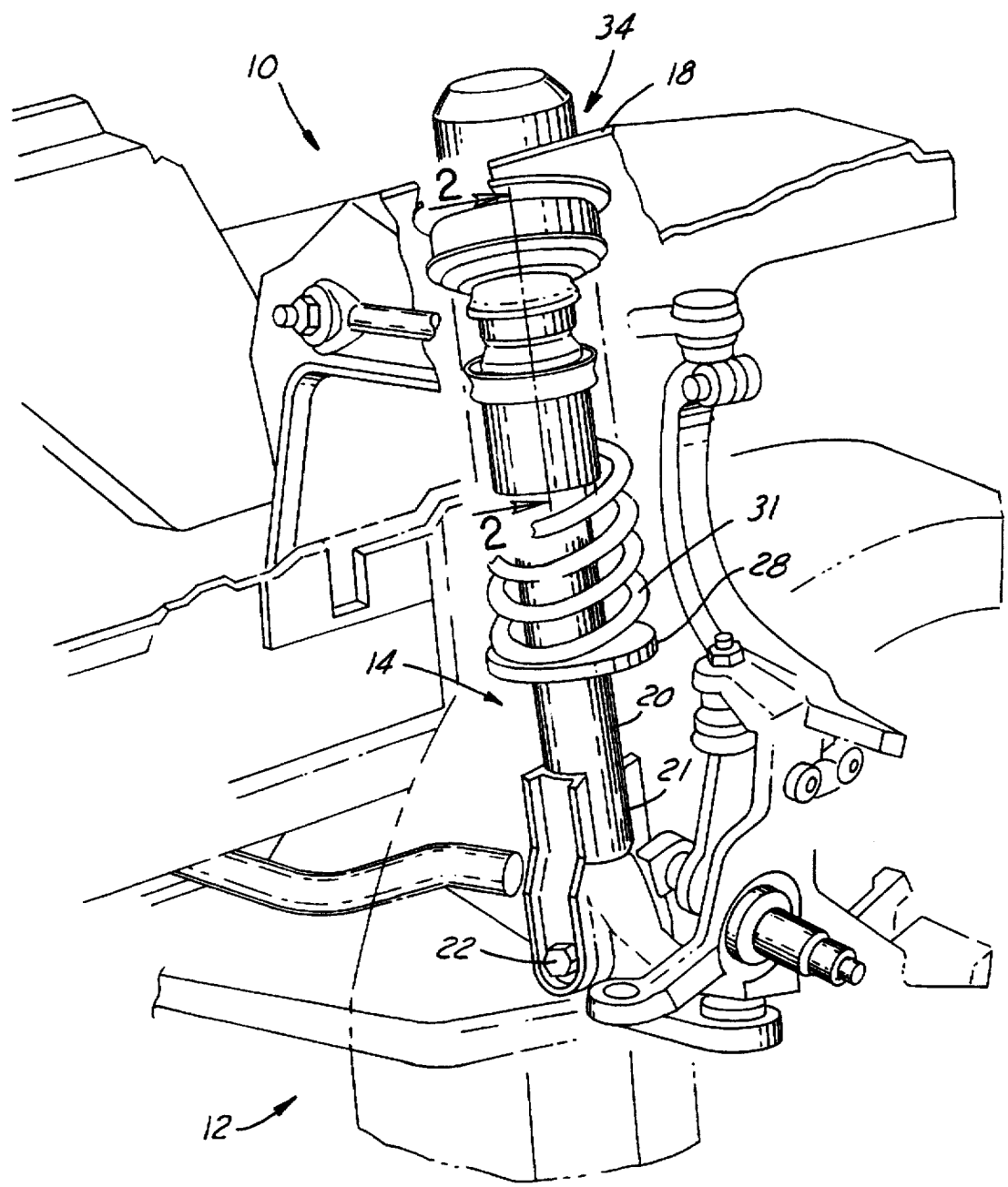
FIG. 1 is a perspective view of a motor vehicle suspension disposed within a chassis incorporating a shock absorbing apparatus in accordance with the present invention.

Referring now to FIG. 1, a motor vehicle chassis 10 and a left independent front suspension 12 having a shock absorber 14 is shown. It should be noted that a unitized body is shown, however, a body on frame style chassis could be used with equivalent operability and functionality as it relates to the invention described herein. It also should be noted that a shock absorber will be described as illustrated, however, the present invention may be employed on vehicles utilizing McPherson style strut assemblies in lieu of conventional shock absorbers with equivalent operability and functionality. The shock absorber 14 is attached to a first component 16, which in the present embodiment takes the form of a lateral suspension member, and to a second component 18, which in the present embodiment takes the form of an isolator attached to a vehicle body structural member.

Figure 3:
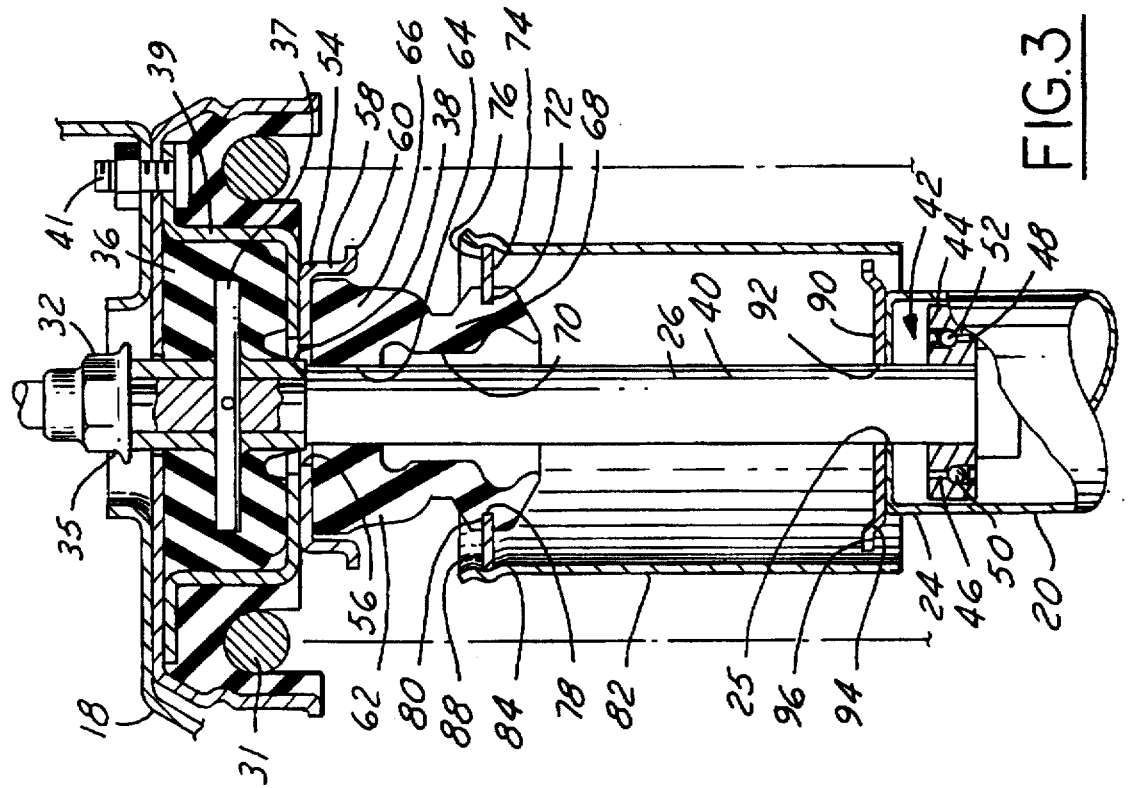
FIG. 3 is a partial sectional view taken from FIG. 1 showing the shock absorbing apparatus in a fully extended position according to the present invention.
Figure 2:
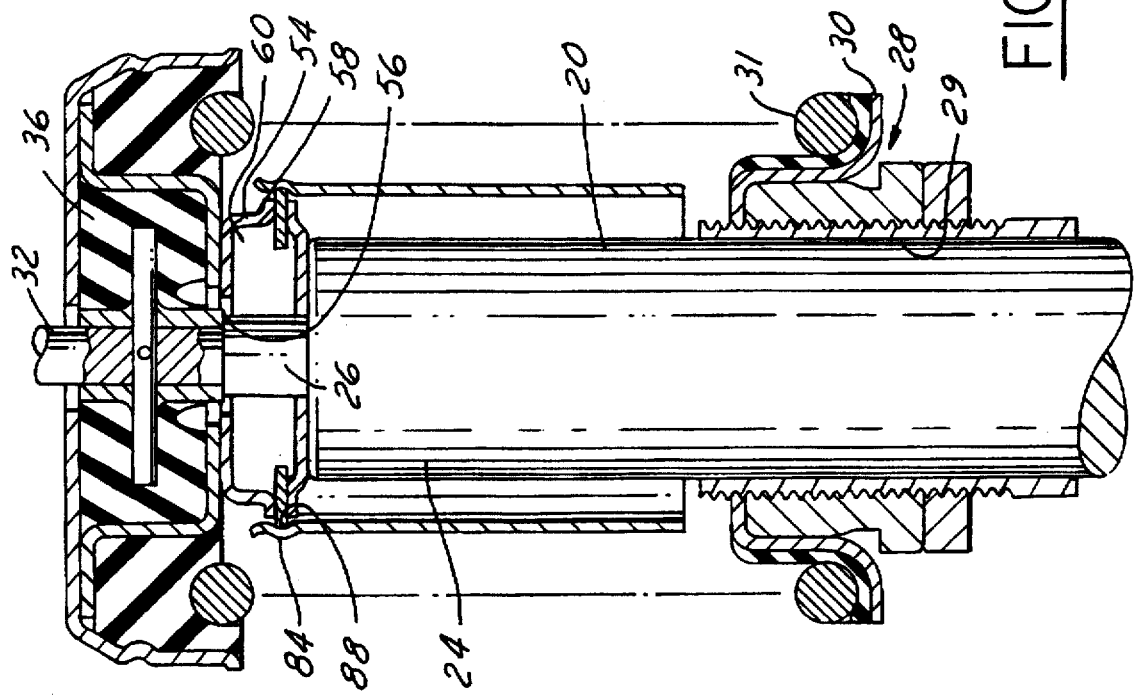
FIG. 2 is a partial sectional view taken from FIG. 1 showing the shock absorbing apparatus in a fully compressed or jounced state according to the present invention.

Referring now to FIGS. 1, 2 and 3, the shock absorber includes a first hollow member 20 having a closed first end 21 conventionally attached to the first component 16 via a threaded fastener 22. The first hollow member also includes a second end 24 opposite the first end 21 and having a sealed aperture 25 for retaining damping fluid and receiving a rod 26 therethrough.

The first hollow member also includes a spring perch 28 attached to an outer circumference 29 of the first hollow member 20 adjacent the second end 24. The spring perch 28 includes a support member 30 for supporting a coaxially disposed coil spring 31. The location of the support member 30 on the first hollow member 20 may be adjustable, as shown, or fixed in a predetermined position.

The rod 26 includes a first end 32 conventionally attached to the second component 18, in this case a bayonet style isolation mount 34. A threaded fastener 35 and a shoulder 38 formed in the first end 32 of the rod 26 provide a clamping force to retain a support member 37 within an elastomeric isolator 36. The elastomeric isolator 36 is contained within an isolator housing 39 which is secured to the vehicle structure by a fastener 41 as shown.

The rod also includes a second end 40 slidably disposed within the first hollow member 20. A valve assembly 42 is securely attached to the second end and includes a piston 44 sealingly engaged with the interior surface of the first hollow member 20. First and second flow orifices 46, 48 include metering valves 50, 52 for controlling the damping forces generated by the forced passage of damping fluid therethrough during extension and compression of the shock absorber.

A first metallic member 54, which in the present embodiment is attached to the isolator housing 39, includes a first aperture 56 for receiving the rod 26 therethrough. Alternatively, the first metallic member 54 may be retained by the clamping force generated by the fastener 35 and the shoulder 38. The first metallic member 54 may be formed in the shape of a cup, having an axial portion 58 extending axially from the circumference of the first metallic member toward the second end 40 of the rod 26. As an additional improvement, the first metallic member 54 may also include a radial portion 60 extending from the end of the axially portion 58 to provide increased bearing surface.

An elastomeric member 62 includes a second aperture 64 for receiving the rod 26 therethrough. The elastomeric member 62 may be bonded or interference fit within the cup formed by the first metallic member 54, or, alternatively, an interference fit between the second aperture 64 and the rod 26 may retain the elastomeric member 62 relative to the first end 32 of the rod 26.

In the preferred embodiment, the elastomeric member 62 includes a main body portion 66 and an axial portion 68 depending downwardly therefrom toward the second end 40 of the rod 26. The axial portion 68 may be formed somewhat like an accordion, with an inner diameter 70 greater than that of the second aperture 64 in the main body portion 66. The axial portion 68 may also include a channel 72 formed on an outer surface thereof for engaging a second metallic member 74.

The second metallic member 74 includes an outer periphery 76 and a third aperture 78 having an inner periphery 80 for receiving the rod 26 therethrough and engaging the channel 72 of the elastomeric member 62. The second metallic member 74 may be formed as a planar disc to provide improved metal to metal contact and force transfer through the shock absorber.

A second hollow member 82 includes a first end 84 attached to the outer periphery 76 of the second metallic member 74 and extends toward the second end 40 of the rod 26 so as to shield the rod 26 against dust and debris, thereby preserving its exterior surface finish. An inwardly opening channel 88 may be formed on an inner surface of the first end 84 of the second hollow member 82 to provide a snap fit engagement with the outer periphery 76 of the second metallic member 74.

A third metallic member 90 may be attached to, or integrally formed therewith, the second end 24 of the first hollow member 20 and includes a fourth aperture 92 for receiving the rod 26 therethrough. The third metallic member 90 may be formed in the shape of a cup, having an axial portion 94 extending axially from the second end 24 of the first hollow member 20 toward the first end 32 of the rod 26. Beneficially, the cup configuration positively controls the compression of the axial portion 68 of the elastomeric member 62.

The third metallic member 90 may also include a radial portion 96 extending from an end of the axial portion 94 to provide increased bearing surface for metal to metal contact with the second metallic member 74. It is desirable for the radial portion 96 of the third metallic member 90 to match the radial portion 60 of the first metallic member 54 so as to provide for even load transfer during metal to metal contact.

Referring to FIGS. 1, 2 and 3, operation of the present invention will be described. As the suspension arm 16 travels from a fully extended position, as illustrated in FIG. 3, with the second hollow member 82 fully covering the rod 26, into a predetermined compressed state, the elastomeric member 62 is fully compressed, as shown in FIG. 2. The compression of the elastomeric member 62 draws the second hollow member 82 upward to provide clearance for the spring perch 28. Also, due to the alignment of the first, second and third metallic members 54,74, 90, the upward motion of the first hollow member 20 relative to the rod 26 is positively limited by the metal to metal contact of the metallic members. Thus eliminating the need to build additional clearance in the shock absorber to prevent interference of the valve assembly 42 with the first end 21 of the first hollow member 20.

The foregoing description presents one embodiment of the present invention. Details of construction have been shown and described for purposes of illustration rather than limitation. Modifications and alterations of the invention will no doubt occur to those skilled in the art that will come within the scope and spirit of the following claims.

What is claimed:

1. A shock absorbing apparatus for use in a motor vehicle having a first component movably attached to a second component, said shock absorbing apparatus comprising:

a first hollow member having a first end attached to said first component and a second end opposite therefrom;

a rod having a first end adapted to attach to said second component and a second end slidably disposed within said first hollow member;

a first metallic member having a first aperture therein for receiving said first end of said rod therethrough, said first metallic member being attached to said second component;

an elastomeric member having a second aperture therein for receiving said first end of said rod therethrough, said elastomeric member being adjacent to said first metallic member and secured relative to said first end of said rod;

a second metallic member having an outer periphery and a third aperture therein defining an inner periphery for receiving said elastomeric member and said rod therethrough;

a second hollow member having a first end attached to said outer periphery of said second metallic member and extending away from said second metallic member toward said second end of said rod; and a third metallic member securely disposed on said second end of said first hollow member;

said first, second and third metallic members being aligned with one another to provide metal to metal contact when said elastomeric member undergoes a predetermined compression.

2. A shock absorbing apparatus according to claim 1, wherein said first metallic member includes an axial portion extending toward said second end of said rod.

3. A shock absorbing apparatus according to claim 2, wherein said first metallic member further includes a radial portion extending radially from said axial portion so as to provide increased surface area for contact with said second metallic member.

4. A shock absorbing apparatus according to claim 1, wherein said elastomeric member includes a main body portion and an axial portion extending therefrom toward said second end of said rod, said axial portion having a larger inner diameter than an inner diameter of said main body portion.

5. A shock absorbing apparatus according to claim 4, wherein said axial portion of said elastomeric member further includes a channel formed in an outer surface thereof.

6. A shock absorbing apparatus according to claim 5, wherein said inner periphery of said second metallic member is secured within said channel of said axial portion of said elastomeric member.

7. A shock absorbing apparatus according to claim 1, wherein said second metallic member is a planar disc.

8. A shock absorbing apparatus according to claim 1, wherein said first end of said second hollow member further includes an inwardly opening channel formed on an inner surface so as to snap fit over said outer periphery of said second metallic member.

9. A shock absorbing apparatus according to claim 1, wherein said third metallic member includes an axial portion extending toward said first end of said rod.

10. A shock absorbing apparatus according to claim 9, wherein said third metallic member further includes a radial portion extending radially from said axial portion so as to provide increased surface area for contact with said second metallic member.

11. A shock absorbing apparatus for use in a motor vehicle having a first component movably attached to a second component, said shock absorbing apparatus comprising:

a first hollow member having a first end attached to said first component and a second end opposite therefrom;

a rod having a first end adapted to attach to said second component and a second end slidably disposed within said first hollow member;

a first metallic member having a first aperture therein for receiving said first end of said rod therethrough and an axial portion extending toward said second end of said rod and a radial portion extending radially therefrom, said first metallic member being secured to said second member;

an elastomeric member having a second aperture therein for receiving said first end of said rod therethrough, said elastomeric member being adjacent to said first metallic member and secured relative to said first end of said rod;

a second metallic member having an outer periphery and a third aperture therein defining an inner periphery for receiving said elastomeric member and said rod therethrough;

a second hollow member having a first end attached to said outer periphery of said second metallic member and extending away from said second metallic member toward said second end of said rod; and a third metallic member having an axial portion extending said first end of said rod and a radial portion extending radially therefrom, said third metallic member being securely disposed on said second end of said first hollow member;

said first, second and third metallic members being aligned with one another to provide metal to metal contact when said elastomeric member undergoes a predetermined compression.

12. A shock absorbing apparatus according to claim 11, wherein said rod includes a shoulder for clamping said first metallic member and said elastomeric member between said shoulder and said second component so as to resist movement relative to said rod.

13. A shock absorbing apparatus according to claim 11, wherein said elastomeric member includes a main body portion and an axial portion extending therefrom toward said second end of said rod, said axial portion having a larger inner diameter than an inner diameter of said main body portion.

14. A shock absorbing apparatus according to claim 13, wherein said axial portion of said elastomeric member further includes a channel formed in an outer surface thereof.

15. A shock absorbing apparatus according to claim 14, wherein said inner periphery of said second metallic member is secured within said channel of said axial portion of said elastomeric member.

16. A shock absorbing apparatus according to claim 11, wherein said second metallic member is a planar disc.

17. A shock absorbing apparatus according to claim 11, wherein said first end of said second hollow member further includes an inwardly opening channel formed on an inner surface so as to snap fit over said outer periphery of said second metallic member.

* * * * *